United States Patent Office 3,755,408
Patented Aug. 28, 1973

3,755,408
PROCESS FOR THE PREPARATION OF POLYBORIC ESTERS
Giovanni Cuneo, Milan, Italy, assignor to Montecatini-Edison S.p.A., Milan, Italy
No Drawing. Continuation of application Ser. No. 571,706, Aug. 11, 1966. This application Feb. 10, 1970, Ser. No. 9,118
Claims priority, application Italy, Aug. 11, 1965, 18,249/65
Int. Cl. C07f 5/04
U.S. Cl. 260—462 R                   5 Claims

ABSTRACT OF THE DISCLOSURE

A process for making polyboric esters of the general formula $$(RO)_3 \cdot (B_3O_3)_m$$

wherein $m$ is greater or equal to 1 but preferably less than 2 and corresponds to the molar ratio of boron atoms to RO units, and R is an alkyl radical with 2–6 carbon atoms, a phenyl radical, or a substituted-phenyl radical in which the substituent is constituted of one or more alkyl groups with 1 to 4 carbon atoms. The method involves mixing orthoboric acid and an inert organic liquid with a boiling point higher than 110° C. and subjecting the mixture to a temperature of 80° C.–220° C. to partially dehydrate the orthoboric acid to a boric acid having a B:OH ratio of 1 to a maximum of 2. The polyboric acid is esterified at 80° to 220° C. by means of an aliphatic alcohol with 2–6 carbon atoms, phenol or a substituted phenol wherein the substituent is at least one alkyl compound with 1–4 carbon atoms.

---

This application is a continuation of application S.N. 571,706, filed Aug. 11, 1966 and now abandoned.

My present invention relates to a process for the preparation of polyborate esters and, more particularly, to a process for preparing organic esters of boron acids in which the ratio between the number of boron atoms and the number of OR-groups (wherein R may be an alkyl radical containing from 2 to 6 carbon atoms or a phenyl or substituted-phenyl is equal to or greater than 1 but preferably less than 2.

According to known techniques such compounds may be prepared by dissolving boric anhydride, in suitable quantities, in alkyl esters of boron acids, such as orthoboric acid or metaboric acid. For these processes high temperatures are required and the heating of the reaction mixture is carried out over prolonged periods which in some cases may be of the order of weeks.

In order to accelerate the rate of formation of such compounds it has also been suggested to carry out the reaction between boric anhydride and alkyl borates in the presence of alcohols; operating in this way has enabled a considerable reduction in reaction temperature, but even in these cases the reaction temperature nevertheless remained at rather high levels.

Thus, an object of my invention is the provision of a process for the preparation of polyborate esters which is free from the disadvantages and drawbacks mentioned above.

In accordance with this invention I have found, surprisingly, that compounds containing boron, carbon, hydrogen and oxygen, having the following structural formula:

$$(RO)_3B \cdot (B_2O_3)_n$$

where R is an alkyl radical containing from 2 to 6 carbon atoms or a phenyl or substituted-phenyl radical and $n$ is a number higher than or equal to 1, but preferably less than 2, can be prepared through a process which comprises the suspension of an inorganic boron acid in a boiling organic liquid, the heating of the suspension between 80° and 220° C. in order to cause a suitable dehydration of the acid itself, and the esterification at temperature between 80° and 220° C. of the so dehydrated acid with an organic hydroxy compound, i.e. a compound containing at least one OH-group, preferably in the presence of an azeotropic entrainer for the removal of water produced during the esterification reaction through the formation of a binary (or ternary) azeotrope between the azeotropic entrainer and the water as well as the hydroxy compound, so as to shift the reaction equilibrium in a direction favorable to the formation of the polyborate esters. The formula $(RO)_3B \cdot (B_2O_3)_n$ corresponds to the formula $(RO)_3 \cdot (B_3O_3)_m$, wherein $m$ is the ratio of boron atoms to OR groups and $1 \leq m < 2$. Thus $n$ is a true formula subscript while $m$ represents a molar or atomic ratio.

As the esterification reaction proceeds, the boron acids gradually pass into solution as polyborate esters. By removing the organic liquid through vacuum distillation at a temperature that is not so high as to cause decomposition of the polyborate ester, this latter can be obtained in its pure state.

Many advantages flow from the process according to this invention; above all there is the possibility of using exclusively as a source of boron, in place of boric anhydride, less expensive and more easily handable compounds e.g. the oxygenated acids of boron. In the second place, it is possible to prepare the polyborate esters by a one-step process, contrary to what is known from the prior art wherein it has been necessary to prepare an organic ester of boric acid and then to admix it with the boric anhydride. In the process according to this invention, boric acid $H_3BO_3$ and the acids derived from it by partial dehydration, such as metaboric acid $HBO_2$ or tetraboric acid $H_2B_4O_7$, may be used as sole sources of boron.

The quantity of acid to be esterified determines the quantity of organic hydroxy compound to be used as the esterifying agent, inasmuch as the excess of such compound, which enters into the formation of an azeotrope, may be subsequently separated according to conventional techniques as used in industrial processes for the concentration of the aliphatic alcohols and particularly of ethyl alcohol.

The organic liquid to be used as a suspending medium for the boric acid, in the initial part of the process according to the invention during which dehydration to polyborate acid is carried out, may be chosen from a wide range of compounds. In fact, any organic fluid may be used that has a boiling point at atmospheric pressure higher than 110° C. and does not interact with the boric acid or with the esterifying compound. For the present purposes the following substances may be cited: diethylbenzene, xylene, ethylbenzene, p-cymene, dipentene, n-nonane, n-decane, decahydronaphthalene, ethylpropylbenzene, propylbenzene, butylbenzene (derived from normal butyl, isobutyl or tertiary butyl), cyclohexanone, monochlorobenzene, dichlorobenzene, chlorotoluenes, benzyl chloride and the like.

The quantity of organic liquid to be used with respect to the boric acid is not critical; however, it is preferred to operate in the presence of an excess of organic liquid over that necessary for the formation of a dispersion with the boric acid.

In the process according to this invention the duration as well as the temperature at which this first phase of the process is conducted depend on the type of boric acid and organic liquid used as well as on the desired degree of dehydration. The organic hydroxy compound which by reaction with the polyboric acid (dehydrated boric acid) yields the polyborate by esterification, may be chosen from a wide range of compounds. Particularly favorable results have been achieved with the aliphatic alcohols containing from 2 to 6 carbon atoms and with phenols, either simple or substituted.

In the process according to this invention, the quantity of organic hydroxy compound to be used with respect to the starting boric acid depends on various factors among which the most important are:

(1) The degree of esterification to which it is desired to bring the polyboric acid;

(2) The quantity of organic hydroxy compound necessary for the formation of the azeotrope by means of which the water formed during the esterification is removed from the system; and (3) The quantity of the hydroxy compound necessary for ensuring at all stages of the process a sufficiently high reaction rate.

In any event I prefer to operate, according to a feature of this invention, with molar quantities of the hydroxy compound exceeding those required for the desired degree of esterification of the polyboric acid. Particularly satisfactory results have been obtained by adding the predetermined quantity of this compound gradually to the reaction system so as to avoid temporary variations in the esterification temperature. The temperature and the duration of the esterification reaction will vary according to the type of alcohol and polyboric acid used and according to the degree of esterification that one wishes to attain.

As mentioned above, the esterification reaction of the polyboric acid to polyborate is preferably carried out in the presence of a substance having the function of azeotropic entrainer, i.e. a substance capable of forming an azeotrope with the water produced during the esterification, and must therefore allow the removal of this water from the reaction medium. The azeotropic entrainer should also be capable of forming an azeotrope with the organic hydroxy compound so as to permit the removal from the reaction medium of the otherwise unreacted compound. Thus, in order to ensure complete elimination of the organic compound it is preferable to operate in the presence of an excess of the azeotropic entrainer.

In the process according to this invention, the azeotropic entrainer may be chosen from a wide range of compounds, including benzene, xylene, di-isobutylene, 1-octene, the trimer and tetramer of propylene, toluene and the like.

EXAMPLE I 247.36 grams (4 moles) of orthoboric acid ($H_3BO_3$) and 800 grams of crude diethylbenzene (a mixture of the three isomers) with a boiling point of about 183° C. were put into a 3-liter four-neck flask provided with a stirrer, a thermometer, a graduated supply cylinder and a rectification column. The mixture of $H_3BO_3$ and diethylbenzene was then stirred and heated.

As soon as the temperature of the contents of the flask was higher than 100° C., a mixture of water and diethylbenzene was distilled off; this mixture, by cooling, was separated into two phases; a lower aqueous phase, and an upper organic phase consisting of diethylbenzene which was recycled to the reaction flask.

In the meantime, the temperature of the flask contents was gradually increased to 190° C. After about an hour from beginning of heating, 85 grams of water had been distilled.

In this manner a polyboric acid was obtained with a ratio between the number of boron atoms and the number of OH groups ranging between 1 and 2.

At this point the esterification reaction of the thus obtained polyboric acids was commenced, and for this purpose, by means of the graduated cylinder, a mixture of 500 grams of benzene and 300 grams of ethyl alcohol was fed into the reaction flask wherein the polyboric acids were suspended, with maintenance of the temperature between 80 and 140° C. The water formed during the esterification reaction was distilled in the form of a ternary azeotrope consisting of water-benzene-ethyl alcohol.

After about three hours of heating, the esterification reaction was found to be complete and all the polyboric acid was dissolved in diethylbenzene in the form of ethylpolyborate.

The excess of ethyl alcohol was removed as the binary azeotrope benzene-ethyl alcohol (boiling point 68.24° C.) and, finally, the residual benzene was also removed. 970 grams of a solution of ethyl polyborate in diethylbenzene remained in the reaction flask. This solution contained 4.43% by weight of boron and 11.07% by weight of ethoxy groups ($OC_2H_5$), corresponding to a molar ratio $B/OC_2H_5$ of approximately $\approx 1.6$.

After a vacuum distillation of diethylbenzene, the pure ethylpolyborate was obtained in the form of a very viscous liquid.

EXAMPLE II

Using the apparatus described in the preceding example, the same amounts of orthoboric acid and of diethylbenzene were employed.

However, in this case the heating necessary for the partial dehydration of orthoboric acid to polyboric acid was carried out for two hours; a total quantity of 89 grams of water was removed in the manner previously described.

The resulting suspension of polyboric acid was esterified by means of the mixture of ethyl alcohol and benzene under the same conditions as in the previous example but with the heating extended for a period of four hours.

After the removal of the water and of the excess ethyl alcohol, 990 grams of a solution of ethyl polyborate were obtained containing 4.33% by weight of boron and 13.5% by weight of ethoxy groups ($OC_2H_5$), corresponding to a molar ratio $B/OC_2H_5$ of approximately 1.35.

After a vacuum distillation of diethylbenzene, pure ethyl polyborate was again obtained in the form of a highly viscous liquid.

EXAMPLE III

The same apparatus as described in Example I was used with the same amounts of orthoboric acid and diethylbenzene.

290 grams of n-butyl alcohol were added, drop by drop, to the suspension of polyboric acid for one hour and a half and removal of 88 grams of water therefrom. The temperature of the reaction vessel was kept between 120 and 185°C. while the water formed during the reaction was removed in the form of an azeotrope water-n-butylalcohol with a boiling point of 92.7° C.

1040 grams of a solution of butylpolyborate were obtained containing 4.22% by weight of boron and 16.34% by weight of butoxy ($OC_4H_9$) groups, corresponding to a molar ratio $B/OC_4H_9$ of approximately 1.7. After a vacuum distillation of diethylbenzene, the pure butylpolyborate was obtained as before in the form of a very viscous liquid.

EXAMPLE IV

The apparatus described in Example I was used with the same amount of boric acid. Instead of diethylbenzene, a vehicle consisting of 660 grams of decahydronaphthalene (with a boiling point of 186–193° C.) was employed. 90 grams of water were removed by distillation from the resulting suspension.

The polyboric acid was esterified with 216 grams of phenol dissolved in 400 cc. of toluene. The temperature inside the reaction vessel was kept between 165 and 185° C. At the top of the rectification column, the azetrope toluene-water was collected. After about five hours of heating the esterification reaction was completed and a solution of phenyl polyborate was obtained containing 4.46% by weight of boron and 22.2% by weight of phenoxy ($OC_6H_5$) groups, corresponding to a molar ratio $B/OC_6H_5$ of approximately 1.73.

By cooling, or by evaporation under vacuum of the solvent (Decalin), phenyl polyborate was recovered from this solution in the form of a white solid.

EXAMPLE V 7 kg. of orthboric acid and 20 kg. of diethylbenzene were put into a vessel of 50-liter capacity provided with a centrifugal stirrer, a thermometer, an apparatus for adding the rectants, and a rectification column.

After four hours of heating at 190° C., 2.41 kg. of water had been removed.

The polyboric acids thus obtained were esterified at a temperature between 80 and 150° C. by using a mixture of 5 kg. of ethyl alcohol and 5 kg. of benzene. The subsequent treatment was the one previously described at the end of the reaction, a solution of ethyl polyborate was obtained containing 4.1% by weight of boron and 12.2% by weight of ethoxy ($OC_2H_5$) groups with a molar ratio $B/OC_2H_5$ of approximately 1.4.

After a vacuum distillation of diethylbenzene, ethylpolyborate was obtained in the form of a very viscous liquid.

Using the procedures outlined in Examples I–V reactions were carried out with xylene, p-cymene, dipentene, n-nonane, n-decane, ethylpropylbenzene, propylbenzene, butylbenzene (a mixture of n-butylbenzene, isobutylbenzene and tertbutylbenzene), cyclohexanone, monochlorobenzene, dichlorobenzene, chlorotoluenes and benzyl chloride as substitutes for the suspension vehicles of these examples, these substances proving effective for the partial dehydration of the boron acid. Moreover, boric acid ($H_3BO_3$), metaboric acid ($HBO_2$) and tetraboric acid ($H_2B_4O_7$) were interchangeably used as the inorganic boron acid (containing boron, oxygen and hydrogen) in the several examples and with the substituted suspension liquids mentioned above, with similar results. Propyl alcohol, amyl alcohol and hexyl alcohol were substituted for the ethyl alcohol of Examples I, II and V with recovery of the corresponding esters, while cresol was used in place of the phenol of Example IV with recovery again of the corresponding ester, following the techniques of these examples. Xylene, di-isobutylene, 1-octene, trimeric propylene and tetrameric propylene were used as azeotropic entrainers by substitution for the benzene and toluene of the several examples, again with similar results.

It will be understood that the invention as described admits of many modifications which will be readily recognized by those skilled in the art but which are intended to be included within the spirit and scope of the invention as defined in the appended claims.

I claim:

1. A process for producing a polyboric ester(s) having the formula $$(RO)_3B \cdot (B_2O_3)_n$$

wherein $n$ ranges from 1 to 2 and R represents ethyl, propyl, butyl, phenyl, toluyl, amyl or hexyl, said process comprising the steps of:

(a) suspending orthoboric acid in an inert organic liquid having a boiling point above 110° C. and selected from the group which consists of diethylbenzene, xylene, ethylbenzene, p-cymene, dipentene, n-nonane, n-decane, decahydronaphthalene, ethylpropylbenzene, propylbenzene, butylbenzene, cyclohexanone, chlorobenzenes, chlorotoluenes, and benzylchloride;

(b) heating the suspension resulting from step (a) at a temperature between 80° and 220° C. to partially dehydrate said orthoboric acid and form a polyboric acid therefrom; and (c) esterifying the polyboric acid formed in step (b) by reacting it in said inert organic liquid with an organic esterifying compound containing a hydroxyl group and selected from the group which consists of ethyl alcohol, amyl alcohol, propyl alcohol, butyl alcohol, hexyl alcohol, phenol and cresol, said esterifying compound being added to the inert organic liquid containing the polyboric acid or step (b) without intervening separation of the polyboric acid.

2. The process defined in claim 1 wherein said organic esterifying compound is reacted with said polyboric acid in step (c) in the presence of an entrainer capable of forming an azeotropic system with the water formed by esterification.

3. The process defined in claim 2 wherein said entrainer is capable of forming an azeotropic system with residual quantities of said esterifying compound.

4. The process defined in claim 2 wherein said entrainer is selected from the group which consists of benzene, xylene, di-isobutylene, octene, trimeric and tetrameric propylene, and toluene.

5. The process defined in claim 2, further comprising the step of: distilling in vacuo said inert organic liquid from the reaction mixture formed in step (c) and recovering therefrom the polyboric ester in substantially pure form.

References Cited

UNITED STATES PATENTS

| | | | |
|---|---|---|---|
| 3,083,225 | 3/1963 | May | 260—462 R |
| 2,839,565 | 6/1958 | May | 260—462 R |
| 3,522,286 | 7/1970 | Salvenin et al. | 260—462 R |

OTHER REFERENCES

Remy: Dreatise on Inorganic Chemistry, vol. 1, p. 338 (1956).

Steinberg: Organoboron Chemistry, vol. 1, pp. 38, 445, 446, 462–5, 475 (1964).

LEON ZITVER, Primary Examiner

L. B. DeCRESCENTE, Assistant Examiner